O. N. CRISPELL.
ACETYLENE TORCH.
APPLICATION FILED MAY 5, 1917.
1,261,712.  Patented Apr. 2, 1918.
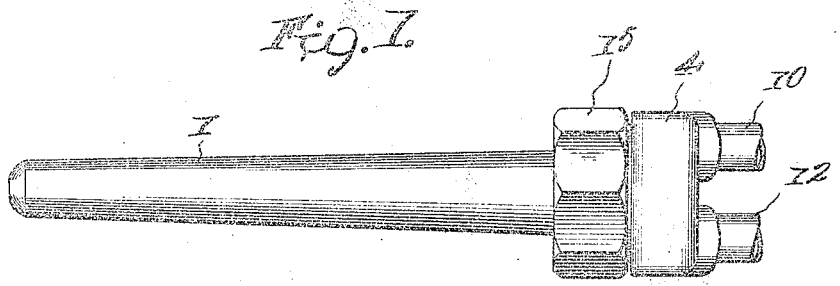
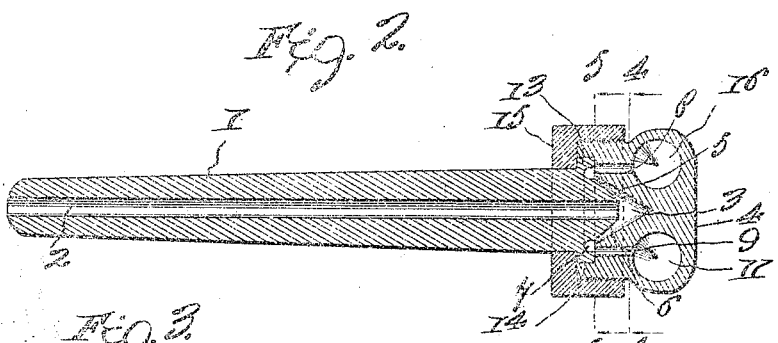
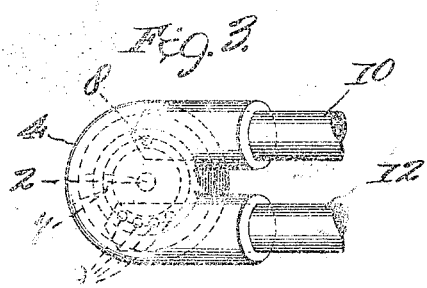
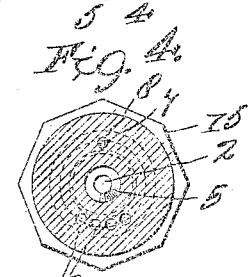
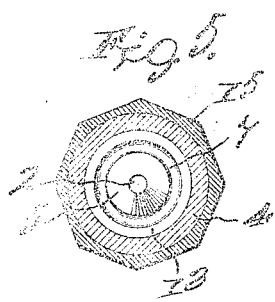
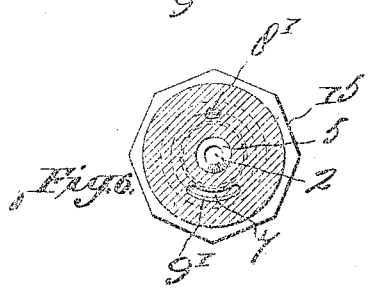

UNITED STATES PATENT OFFICE.

ORIE N. CRISPELL, OF OLIVEBRIDGE, NEW YORK.

ACETYLENE-TORCH.

1,261,712.  Specification of Letters Patent.  Patented Apr. 2, 1918.

Application filed May 5, 1917. Serial No. 166,685.

*To all whom it may concern:*

Be it known that I, ORIE N. CRISPELL, a citizen of the United States, residing at Olivebridge, in the county of Ulster and State of New York, have invented certain new and useful Improvements in Acetylene-Torches; and I do hereby declare the following to be a full, clear, and exact description of the invention, such as will enable others skilled in the art to which it appertains to make and use the same.

The present invention relates to improvements in acetylene torches, and the primary object thereof is to provide an improved acetylene torch which will be of simple, compact and cheap construction, at the same time affording an increased efficiency of the mixture of the gases over present type torches tested by applicant.

Another object of my invention is to provide an improved acetylene torch in which back firing will be less likely to occur, and in which there will be but a single joint, with the result of minimizing the amount of leakage of the gases.

In the accompanying drawings forming a part of this application, and in which similar reference symbols indicate corresponding parts in the several views:

Figure 1 is a side elevational view of an acetylene torch constructed in accordance with the present invention.

Fig. 2 is a longitudinal sectional view through said torch.

Fig. 3 is a top plan view of the improved torch with the supply pipes shown broken away.

Fig. 4 is a transverse sectional view taken on the line 4—4 of Fig. 2.

Fig. 5 is a similar view taken on the line 5—5 in Fig. 2; and

Fig. 6 is a cross sectional view similar to Fig. 4 but illustrating a slight modification.

In the drawings is shown one embodiment, together with a slight modification, of which my improved torch is susceptible, and while in this embodiment I have shown the invention as applied to a welding nozzle 1, it will be understood that the improvement may be equally well adapted for construction and use in connection with cutting nozzles.

The nozzle 1 is traversed by a bore 2 through which the admixture of oxygen and acetylene are directed against the work in the usual manner; this bore 2, as disclosed to advantage in Fig. 2, running into and communicating with a conical depression 3 in the torch head 4. This conical depression 3 constitutes a final mixing chamber, in which the oxygen and acetylene are introduced in their passage to the bore 2 of the nozzle 1.

The inner end of the nozzle 1 forms a conic frustum, as shown at 5, of smaller dimensions than the depression 3; which depression 3 and frustum 5 coöperate together in the formation of the final mixing chamber, to which the gases are admitted through a flaring passage 6 formed between the two conical walls.

Adjoining the base of the conic frustum 5, the inner end of the nozzle 1 is provided with an annular channel 7, which is, in effect, a preliminary mixing chamber, and which is in connection at one side with the flaring passage 6, and at its outer side, respectively, with admission ducts 8 and 9. The duct 8 communicates with an oxygen space 16 in the head 4, which is supplied as by a pipe 10 from a suitable source, and ordinarily a single duct 8 suffices for the introduction of a proper quantity of oxygen gas. The ducts 9, however, are supplied in a greater number, preferably four, as illustrated in Fig. 4, and these ducts 9 connect the annular channel 7 with an acetylene space 11 at the opposite side of the head 4, and which space 11 is supplied from a convenient source of acetylene by a pipe 12.

It will be apparent, upon an inspection of Fig. 2, that the outer side of the annular channel 7 does not completely register with the ducts 8 and 9, and such ducts 8 and 9 are partially masked by an annular flange 13 on the nozzle 1, which constitutes a metering ring. This flange 13 occupies a seat 14 on the adjacent end of the head 4, and is removably held therein as by a shouldered nut 15. This forms the only joint to be found in my improved device.

In Fig. 6 the modification consists in uniting all of the ducts 9 shown in Fig. 4, into a single continuous arcuate slot 9', which communicates with the acetylene space, and which conveys the acetylene into the annular channel 7 in the same manner and with substantially the same result as is obtained by the plurality of ducts 9. In this modification also, an elongated duct 8' takes the place of the circular duct 8 with substantially the same functions.

In operation, oxygen enters through the pipe 10 to the space 16 in the head 4, while at the same time acetylene is admitted through the pipe 12 to its space 11. From the space 16 the oxygen passes through the duct 8 and into the annular channel 7, where it encounters the acetylene which has access to this annular channel 7 through the ducts 9 or the slot 9', as the case may be.

In the annular channel 7 the oxygen and acetylene receive a whirling motion by virtue of the shape of this channel, and which assists to promote an intimate mixture of these two gases. The quantity of acetylene admitted to the annular channel 7 or primary mixing chamber is, of course, substantially equal to the oxygen admitted thereto, as is provided for by the increased number of ducts 9 or the greater area of the slot 9', and is necessary for obtaining the proper admixture to give the required combustion and heat at the mouth of the nozzle 1.

The quantities in which the two gases are admitted to the annular channel 7 is regulated by the metering ring 13 and the cross sectional area of said channel 7.

Several nozzles may be utilized in conjunction with a single head 4, which have these parts 13 and 7 of varying proportions, so that that nozzle may be employed which gives the required quantity of the admixed combustible.

After their preliminary mixing in the annular channel 7, the combined gases escape through the flaring passage 6, and enter the depression 3 in which the gases are continuously commingled and receive their final mixture, after which they pass out through the port 2 of the nozzle 1 and are ignited.

In consequence of the constricted outlet afforded by the flaring passage 6, there will arise a back pressure of the gases in the preliminary chamber 7 such as to cause the oxygen and acetylene to more thoroughly mingle.

It will be understood that, by reason of the specific construction and location of the gas passages, the oxygen and acetylene will be quickly and thoroughly mixed, and after mixture will be quickly discharged through the port 2 of the nozzle 1, whereby the liability to back fire will be reduced to a minimum; and owing to the single joint in the device, which may be made exceedingly tight by the nut 15, there will be little likelihood of the gases escaping between the head and nozzle, which is a common cause of trouble in torches as now found in use.

It is obvious that those skilled in the art may vary the details of construction and arrangements of parts without departing from the spirit of my invention, and therefore I do not wish to be limited to such features except as may be required by the claims.

I claim:

1. A torch of the character described comprising a bored nozzle, a flange on said nozzle, an annular preliminary mixing chamber therein, a head having gas spaces and ducts connecting the gas spaces with said chamber, said head also having a depression opposite the end of said bored nozzle and providing therewith a final mixing chamber, a passage connecting said preliminary and final mixing chambers, and means engaging said flange and head for securing the nozzle to the latter, substantially as described.

2. A torch of the character described comprising a bored nozzle having a frusto-conical end, a flange on said nozzle, an annular preliminary mixing chamber therein, a head having gas spaces and passages connecting the gas spaces with said chamber, said head also having a conical depression opposite said frusto-conical end whereby to provide therewith a final mixing chamber in connection with said first-named chamber, and means engaging said flange and head for securing the nozzle to the latter, substantially as described.

3. A torch of the character described comprising a nozzle having a frusto-conical end, a head having a conical depression into which said end fits and forms therewith a final mixing chamber, a preliminary mixing chamber, said head having gas spaces and ducts connecting the spaces with said preliminary mixing chamber, a metering device for regulating the flow through said ducts to said preliminary chamber, a flange on said nozzle, and means engaging said flange and head to secure the nozzle to the latter, substantially as described.

4. A torch including a head having gas spaces with ducts leading therefrom and a conical depression therein, a nozzle provided with a frusto-conical end fitted into said depression and forming therewith a final mixing chamber, a flange on said nozzle, an annular preliminary mixing chamber in said flange in communication with said ducts, a metering ring formed by one wall of said preliminary mixing chamber to regulate the flow thereinto, and a flaring passage establishing communication between said preliminary and final mixing chamber, substantially as described.

5. A torch as described including a head having gas spaces with connections to deliver oxygen and acetylene and ducts leading from said spaces, the area of the ducts being greater for the acetylene than the oxygen, said head also having a seat and a conical depression, a nozzle having a frusto-conical end fitted into said depression and providing a final mixing chamber therewith, a flange on said nozzle occupying said seat, an annular preliminary mixing chamber in said flange in communication with said ducts, a metering ring formed by the wall of said chamber for regulating the flow thereinto, and a shouldered nut engaging said flange for attaching the nozzle and head together, substantially as described.

In testimony whereof, I affix my signature.

ORIE N. CRISPELL.